US010146370B2

(12) United States Patent
Mori et al.

(10) Patent No.: US 10,146,370 B2
(45) Date of Patent: Dec. 4, 2018

(54) TOUCH PANEL DEVICE HAVING STATE RESTORATION FUNCTION

(71) Applicant: Mitsubishi Electric Corporation, Tokyo (JP)

(72) Inventors: Seiichiro Mori, Tokyo (JP); Kageyasu Miyahara, Tokyo (JP); Yuichi Okano, Tokyo (JP); Yusuke Shimasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 15/050,933

(22) Filed: Feb. 23, 2016

(65) Prior Publication Data

US 2016/0274729 A1   Sep. 22, 2016

(30) Foreign Application Priority Data

Mar. 16, 2015  (JP) .................................. 2015-051846

(51) Int. Cl.
*G06F 3/041*     (2006.01)
*G06F 3/044*     (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| 5,602,975 A | 2/1997 | Kataoka et al. |
| 2007/0207681 A1* | 9/2007 | Zabroda ............. G06K 9/00053 439/717 |
| 2013/0069891 A1 | 3/2013 | Tanaka |
| 2013/0155005 A1* | 6/2013 | Liang ..................... G06F 3/044 345/174 |

(Continued)

FOREIGN PATENT DOCUMENTS

| EP | 2696268 A2 * | 2/2014 | ............ G06F 3/044 |
| JP | 59-149424 A | 8/1984 | |

(Continued)

OTHER PUBLICATIONS

An Office Action; "Notification of Reasons for Refusal" issued by the Japanese Patent Office dated Oct. 16, 2018, which corresponds to Japanese Patent Application No. 2015-051846 and is related to U.S. Appl. No. 15/050,933; with English translation.

*Primary Examiner* — Chun-Nan Lin
(74) *Attorney, Agent, or Firm* — Studebaker & Brackett PC

(57) ABSTRACT

In a touch panel device, an output control unit controls a process of outputting touch information acquired by a sensing unit and a touch detection unit of a touch sensor panel to host equipment, where the information indicates presence or absence and a coordinate of a touch of an indicator to the touch sensor panel. A state sensing unit senses an operation state of the sensing unit or the touch detection unit. A state restoration unit restores the sensing unit or the touch detection unit in the abnormal state to a normal state, based on a detection result of the state sensing unit. Upon detecting an abnormal state in the state sensing unit, an output control unit stops an output of the touch information to the host equipment for a fixed period of time.

9 Claims, 8 Drawing Sheets

(56) References Cited

U.S. PATENT DOCUMENTS

| | | | |
|---|---|---|---|
| 2013/0201122 A1* | 8/2013 | Kurashima | G06F 3/041 345/173 |
| 2013/0234987 A1* | 9/2013 | Ye | G06F 3/0418 345/174 |
| 2013/0265242 A1* | 10/2013 | Richards | G06F 3/0418 345/173 |
| 2014/0118305 A1* | 5/2014 | Jang | G06F 3/0418 345/175 |

FOREIGN PATENT DOCUMENTS

| | | | | |
|---|---|---|---|---|
| JP | H5-80921 A | | 4/1993 | |
| JP | 06-255184 A | | 9/1994 | |
| JP | H6-309092 A | | 11/1994 | |
| JP | 07-160376 A | | 6/1995 | |
| JP | 09-212462 A | | 8/1997 | |
| JP | 09-262356 A | | 10/1997 | |
| JP | H10-40016 A | | 2/1998 | |
| JP | 2006285491 A | * | 10/2006 | |
| JP | 2007-006336 A | | 1/2007 | |
| JP | 2007-336776 A | | 12/2007 | |
| JP | 2008-134836 A | | 6/2008 | |
| JP | 2008-538409 A | | 10/2008 | |
| JP | 2009016969 A | * | 1/2009 | H04L 65/1066 |
| JP | 2009217486 A | * | 9/2009 | |
| JP | 2010086285 A | * | 4/2010 | |
| JP | 2010191692 | * | 9/2010 | |
| JP | 2013-59986 A | | 4/2013 | |
| JP | 2013-161397 A | | 8/2013 | |
| JP | 2015035206 A | * | 2/2015 | |
| JP | 2015053033 A | * | 3/2015 | G06F 3/044 |
| JP | 2015053058 A | * | 3/2015 | G06F 3/0414 |
| JP | 2016086220 A | * | 5/2016 | |
| WO | WO 2006110649 A2 | * | 10/2006 | G06K 9/00053 |
| WO | WO 2012159290 A1 | * | 11/2012 | G06F 3/0418 |

* cited by examiner

F I G. 3
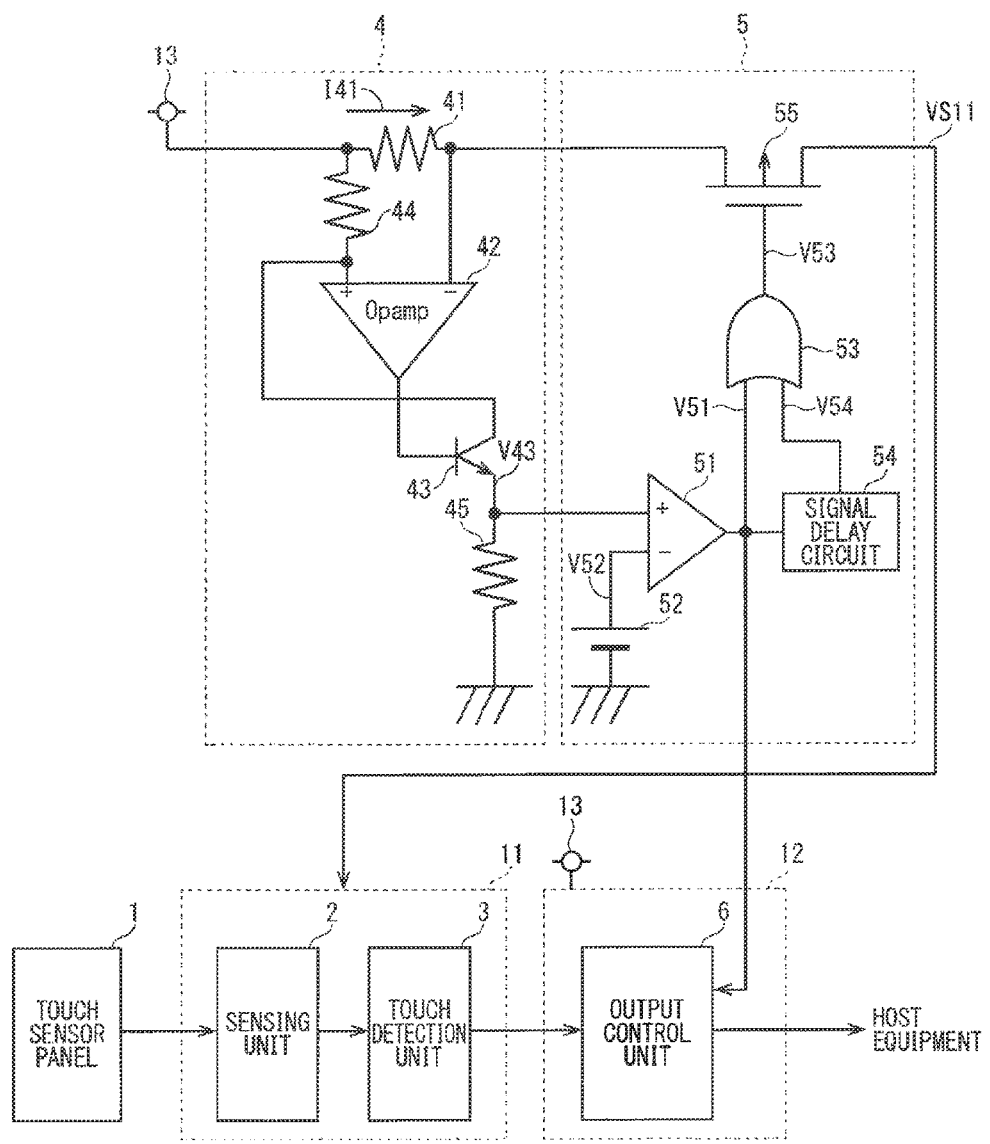

TOUCH PANEL DEVICE HAVING STATE RESTORATION FUNCTION

BACKGROUND OF THE INVENTION

Field of the Invention

The present invention relates to a touch panel device.

Description of the Background Art

Touch panels that detect touches of indicators, such as fingers, and specify coordinates (touch coordinates) indicating the positions of the touches have been widely used in various information processing devices. In particular, touch screens provided with touch panels on the screens of display devices have been popular as new user interfaces of the information processing devices.

Known methods of detecting the touch in the touch panel include a resistance film method and a capacitance method, for example. One example of the capacitance method is a projected capacitive touchscreen (PCT) method. A touch panel in this method is capable of detecting a touch of an indicator even if the front surface of the touch panel is covered by a protection plate (e.g., a glass plate) having a thickness of about several mm. Consequently, sturdiness can be achieved by using the protection plate. Moreover, such a touch panel, which is free from a moving part, has a long life. The PCT touch panels with such advantages have been widely used in apparatuses, such as portable communication equipment including smart phones, automated teller machines (ATMs) in financial institutions, and car navigation devices (Japanese Patent Application Laid-Open No. 2008-134836).

It is important in the touch panels not to receive user's unintended input operations (operating errors). Unfortunately, the PCT touch panels have been seriously facing malfunctions due to electrostatic discharge (ESD) (Japanese Patent Application Laid-Open No. 2013-161397). The ESD occurs because, for example, static electricity excessively charged in a user's body is applied to the touch panel via a user's finger.

In a typical PCT touch panel, a plurality of sensors within a touch sensor panel are electrically connected to a semiconductor integrated circuit of a complementary metal oxide semiconductor (CMOS) structure that detects a capacitance. The ESD applied to the touch sensor panel is input from an input terminal of the semiconductor integrated circuit. When the input ESD has a voltage that exceeds the rating of the semiconductor integrated circuit, i.e., a voltage higher than a power supply voltage or a voltage lower than a grounding potential (GND), a latch-up phenomenon in which a large current flows through an unintentional parasitic transistor may occur. In an abnormal state (a latch-up condition) having the latch-up phenomenon, the touch panel fails to function as it should be and further possibly results in its destruction. Moreover, a known method of restoring a latched-up semiconductor integrated circuit to an original normal state includes turning off the power supply of the semiconductor integrated circuit, thus to stop current flowing through the parasitic transistor before turning back on the power supply (Japanese Patent Application Laid-Open No. 59-149424).

Using the restoring method in Japanese Patent Application Laid-Open No. 59-149424 when the ESD renders the touch panel device abnormal loses information about capacitance values and coordinates just before the touch panel device becomes the abnormal state due to the turning-off of the power supply, where the information is stored inside the semiconductor integrated circuit that detects the capacitance of the touch sensor panel. This possibly has an effect on the operation of host equipment connected to the touch panel device, such as incorrect coordinate information is output or coordinate information necessary to indicate completion of a touch operation (touch up) is lost, when the power supply is turned back on.

SUMMARY OF THE INVENTION

It is an object of the present invention to provide a touch panel device capable of restoring a touch panel in a normal state while preventing a destruction of the touch panel and a malfunction of host equipment resulting from the touch panel rendered abnormal.

A touch panel device according to the present invention includes a touch sensor panel, a sensing unit, a touch detection unit, an output control unit, a state sensing unit, and a state restoration unit. The sensing unit outputs a signal according to a touch of an indicator to the touch sensor panel. The touch detection unit detects presence or absence and a coordinate of the touch in the touch sensor panel, based on an output of the sensing unit. The output control unit controls an output of touch information to host equipment, where the touch information indicates the presence or absence and the coordinate of the touch detected by the touch detection unit. The state sensing unit senses an operation state of the sensing unit or the touch detection unit. The state restoration unit detects an abnormal state of the sensing unit or the touch detection unit based on a detection result of the state sensing unit, and restores the sensing unit or the touch detection unit in the abnormal state to a normal state. Upon detection of the abnormal state, the output control unit stops the output of the touch information to the host equipment for a fixed period of time after the detection of the abnormal state.

The output control unit stops the output of the touch information to the host equipment for the fixed period of time after the detection of the abnormal state. This prevents the host equipment from malfunctioning. Moreover, the sensing unit or touch detection unit that is in the abnormal state is restored to a normal state. This prevents a destruction of the touch panel device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic configuration diagram of a state sensing unit and a state restoration unit of the touch panel device according to the first preferred embodiment;

DESCRIPTION OF THE PREFERRED EMBODIMENTS

The following describes preferred embodiments of the present invention with reference to the drawings. Hereinafter, to avoid redundant descriptions, components having identical or corresponding functions are denoted by the same reference signs in the figures.

First Preferred Embodiment

Figure 1:
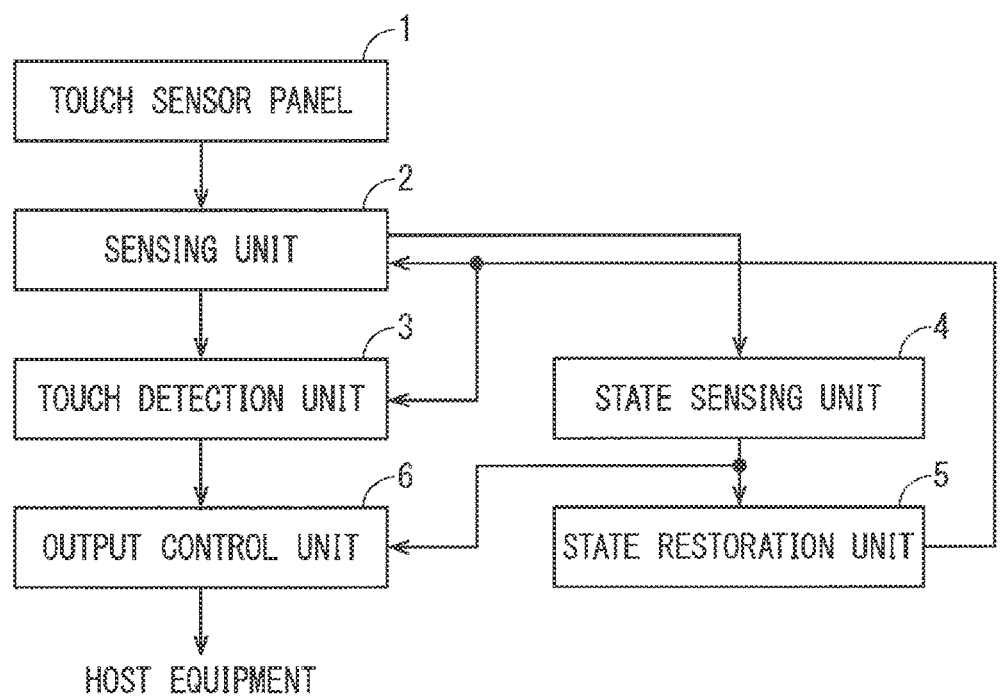
FIG. 1 is a schematic configuration diagram of a touch panel device according to a first preferred embodiment.

FIG. 1 is a schematic configuration diagram of a touch panel device according to a first preferred embodiment. As illustrated in FIG. 1, the touch panel device includes a touch sensor panel 1, a sensing unit 2, a touch detection unit 3, a state sensing unit 4, a state restoration unit 5, and an output control unit 6.

The touch sensor panel 1 includes a plurality of sensors. The sensing unit 2 measures a capacitance within a touch panel using outputs of the sensors, thus outputting a signal according to a touch of an indicator to the touch panel sensor 1. The touch detection unit 3 detects a coordinate (a touch coordinate) indicating presence or absence and the position of the touch of the indicator to the touch sensor panel 1. Although a method of detecting a touch in a touch panel of a PCT method include various detecting methods, such as a self-capacitance method and a mutual-capacitance method, any detecting method may be employed in which a measurement value (a sensor measurement value) capable of detecting the position of the indicator from the sensors of the touch sensor panel 1 can be acquired.

The state sensing unit 4 senses operation states of the sensing unit 2 and the touch detection unit 3, and then outputs signals indicating the operation states. The state restoration unit 5 detects abnormal states of the sensing unit 2 and the touch detection unit 3 on the basis of the output signals of the state sensing unit 4, and then performs a process for restoring the abnormal states of the sensing unit 2 and touch detection unit 3 to normal states.

Information (touch information) about the presence or absence and the coordinate of the touch to the touch sensor panel 1 detected by the touch detection unit 3 is output to external equipment connected to the touch panel device through the output control unit 6. The output control unit 6 controls an operation of notifying host equipment of the touch information acquired by the touch detection unit 3. In particular, when the state restoration unit 5 detects abnormal states of the touch detection unit 3 and the state sensing unit 4, the output control unit 6 stops the touch information from being output from the touch detection unit 3 to the host equipment for a fixed period of time after the detection of the abnormal states.

Figure 2:
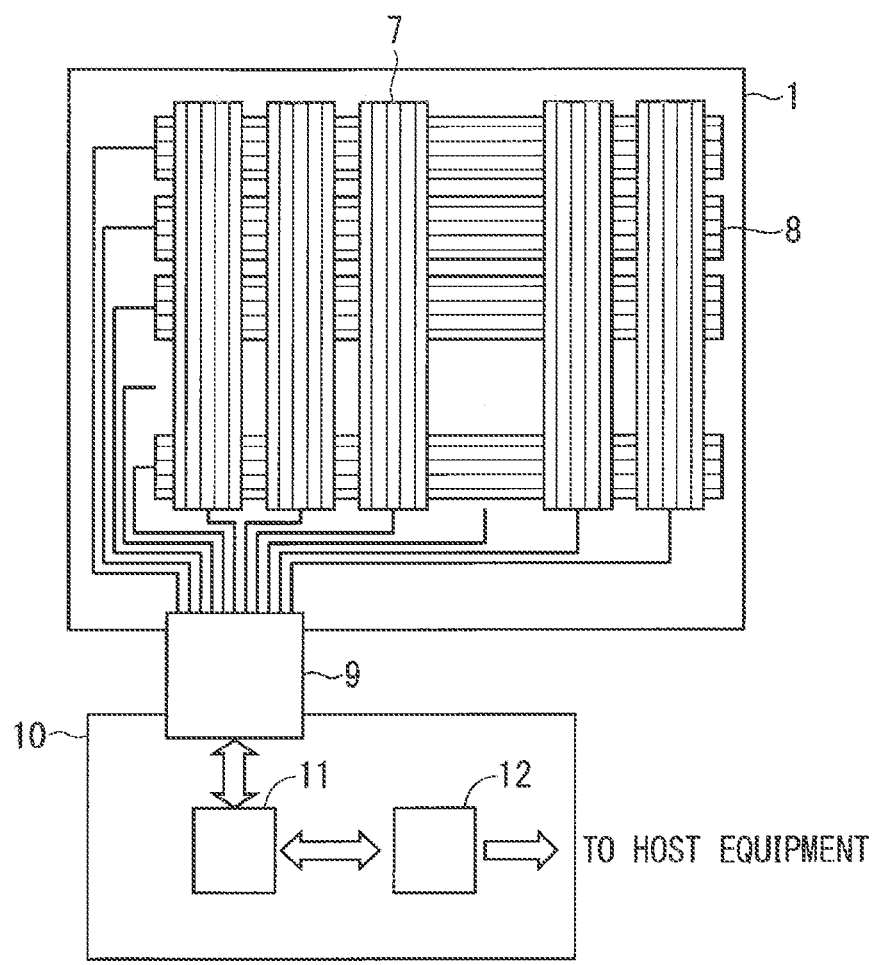
FIG. 2 is a diagram illustrating a hardware configuration of the touch panel device according to the first preferred embodiment.

FIG. 2 is a diagram illustrating a hardware configuration of the touch panel device shown in FIG. 1. As illustrated in FIG. 2, the touch panel device includes the touch sensor panel 1, a touch panel controller substrate 10, (hereinafter simply referred to as a "controller substrate 10"), and a flexible printed circuit (FPC) 9.

The touch sensor panel 1 includes a plurality of X sensor groups 7 each elongating in a vertical direction and arranged in a horizontal direction, and a plurality of Y sensor groups 8 each elongating in a horizontal direction and arranged in a vertical direction. In other words, the X sensor groups and the Y sensor groups are disposed to be orthogonal to each other.

The sensing unit 2, the touch detection unit 3, the state sensing unit 4, the state restoration unit 5, and the output control unit 6, as illustrated in FIG. 1, are mounted on the controller substrate 10. The sensing unit 2 and the touch detection unit 3 are implemented by a semiconductor integrated circuit 11 (hereinafter simply referred to as an "integrated circuit 11"). The output control unit 6 is implemented by an integrated circuit 12 (hereinafter simply referred to as an "integrated circuit 12") that includes a microcomputer mounted on the controller substrate 10. Moreover, the state sensing unit 4 and the state restoration unit 5, which are not shown, are mounted on the controller substrate 10 as a peripheral circuit of the integrated circuit 12. The controller substrate 10 has other circuits mounted thereon, such as another peripheral circuit and a power supply circuit that are necessary for the integrated circuits 11 and 12 to operate.

The X sensor groups and Y sensor groups of the touch sensor panel 1 are connected to a plurality of terminals of the integrated circuit 11 via a lead-out wire and the FPC 9 within the touch sensor panel 1. Moreover, the controller substrate 10 is connected to the host equipment via a connector, a cable and the like that are not shown. The touch information indicating the presence or absence and the coordinate of the touch of the touch sensor panel 1 detected by the touch detection unit 3 is output from the controller substrate 10 to the host equipment. Any communication method between the controller substrate 10 and the host equipment is employed. Such a communication method potentially includes, for example, a universal serial bus (USB), an inter-integrated circuit (I2C), or an asynchronous serial receiver transmitter, i.e., a universal asynchronous receiver transmitter (UART).

FIG. 3 illustrates the configuration of the touch panel device in FIG. 1 in more detail, and particularly illustrates an example of specific configurations of the state sensing unit 4 and the state restoration unit 5. Note that the figure omits some components, such as a bypass capacitor and a power supply protection circuit that are commonly provided in an integrated circuit.

The state sensing unit 4 and the state restoration unit 5 are inserted in a power supply wire for supplying a power supply voltage generated by a power supply circuit 13 to the integrated circuit 11. In addition, the power supply voltage generated by the power supply circuit 13 is also supplied to the integrated circuit 12 including the output control without via the state sensing unit 4 and the state restoration unit 5. That is, a path for supplying a power supply from the power supply circuit 13 to the output control unit 6 is different from a path for supplying a power supply from the power supply circuit 13 to the sensing unit 2 and the touch detection unit 3. Accordingly, the output control unit 6, and the sensing unit 2 or the touch detection unit 3 are driven by substantially different power supplies from each other.

The state sensing unit 4 senses an operation state of the integrated circuit 11 by monitoring the magnitude of current (a power supply current) flowing from the power supply circuit 13 through the integrated circuit 11 (the sensing unit 2 and the touch detection unit 3). A latch-up phenomenon that causes the integrated circuit 11 to be in an abnormal state means that a large current flows through an unintended parasitic transistor. Accordingly, the operation state of the integrated circuit 11 can be identified from the magnitude of the power supply current flowing through the integrated circuit 11.

The state sensing unit 4 is composed of a shunt resistance 41, an operational amplifier (opamp) 42, a transistor 43 as an amplifying element, and resistance elements 44 and 45 that determine an advantage of an amplifying circuit formed by the transistor 43.

The shunt resistance 41 is inserted in the power supply wire for supplying the power supply voltage from the power supply circuit 13 to the integrated circuit 11, and serves to convert a power supply current I41 flowing through the integrated circuit 11 into a voltage. The shunt resistance 41 is simply required to have a resistance value of, for example, about 100 mΩ. The voltage generated in the shunt resistance 41 is input to the operational amplifier 42.

The operational amplifier 42 inputs a voltage proportional to the voltage generated in the shunt resistance 41 to a base of the transistor 43. Consequently, an emitter voltage (voltage V 43) has a value proportional to the power supply current I41 flowing through the integrated circuit 11. This voltage V43 is output from the state sensing unit 4 as a signal indicating an operational state of the integrated circuit 11.

As discussed above, the state sensing unit 4 serves as a current-to-voltage conversion circuit. By using a resistance value R41 of the shunt resistance 41, a resistance value R44 of the resistance element 44 and a resistance value R45 of the resistance element 45, a relationship between the power supply current I41 of the integrated circuit 11 and the output voltage V43 of the state sensing unit 4 is expressed by V43=(R41×R45×I41)÷R44, where input leakage current and input offset voltage of the operational amplifier 42 are disregarded.

The state restoration unit 5 determines that the latch up phenomenon, in which the large current flows through the parasitic transistor of the integrated circuit 11, has occurred and thus the integrated circuit 11 has now fallen into the abnormal state when the output voltage is a predetermined threshold (determination value) or more. In such a case, the state restoration unit 5 further stops supplying the power supply from the power supply circuit 13 to the integrated circuit 11. The state restoration unit 5 then turns back on the power supply, thus eliminating the abnormal state of the integrated circuit 11.

As illustrated in FIG. 3, the state restoration unit 5 is composed of a comparison circuit 51 (a comparator), a reference voltage generation circuit 52, an OR circuit 53, a signal delay circuit 54, and a switch 55.

The output voltage V43 of the state sensing unit 4 is input to a plus terminal of the comparison circuit 51. A reference voltage V52 generated by the reference voltage generation circuit 52 is input to a minus terminal of the comparison circuit 51. The reference voltage V52 is equivalent to a threshold used for determining whether the value of the power supply current I41 is normal or abnormal, i.e., whether the integrated circuit 11 is in a normal state or in the abnormal state.

The comparison circuit 51 compares the output voltage V43 of the state sensing unit 4 with the reference voltage V52, thus determining whether the integrated circuit 11 is in the normal condition or in the abnormal condition and then outputting a signal V51 indicating a determination result. When the integrated circuit 11 is in the normal state, the power supply current I41 flowing through the integrated circuit 11 is small. Consequently, the output voltage V43 of the state sensing unit 4 is lower than the reference voltage V52, and the output signal V51 of the comparison circuit 51 is in a low level. When the integrated circuit 11 is in the abnormal state, however, the power supply current I41 flowing through the integrated circuit 11 is large. Consequently, the output voltage V43 of the state sensing unit 4 is the reference voltage V52 or larger, and the output signal V51 of the comparison circuit 51 is in a high level.

Note that the comparison circuit 51 preferably has a hysteresis property in order to prevent chattering. Moreover, the comparison circuit 51, which is an analog circuit, operates at a high speed and thus can shorten time that the state restoration unit 5 takes after detecting the abnormal state of the integrated circuit 11 and before stopping supplying the power supply to the integrated circuit 11.

The output signal V51 of the comparison circuit 51 is input to one input terminal of the OR circuit 53. Moreover, the output signal V51 of the comparison circuit 51 is input to the other input terminal of the OR circuit 53 via the signal delay circuit 54. The output signal V51 of the comparison circuit 51 is also input to the output control unit 6 of the integrated circuit 12.

An output signal V54 of the signal delay circuit 54 reaches a high level according to a rise of the output signal V51 of the comparison circuit 51 and returns to a low level once a delay time set in advance has elapsed from a fall of the output signal V51 of the comparison circuit 51.

The OR circuit 53 outputs a signal V53 that is the OR of the output signal V51 of the comparison circuit 51 and the output signal V54 of the signal delay circuit 54. The output signal V 53 of the OR circuit 53 is thus in a high level from a rise time of the output signal V51 of the comparison circuit 51 until a time at which the delay time of the signal delay circuit 54 has elapsed after the fall of the output signal V51 of the comparison circuit 51. That is, although timing at which the output signal V53 of the OR circuit 53 rises is almost the same as timing at which the output signal V 51 of the comparison circuit 51 rises, the length of a period of time during which the output signal V53 of the OR circuit 53 is in a high level is longer than that during which the output signal V51 of the comparison circuit 51 is in the high level.

The switch 55 is inserted to the power supply wire for supplying the power supply voltage from the power supply circuit 13 to the integrated circuit 11 and is controlled by the output signal V53 of the OR circuit 53. A field effect transistor (FET) of p-channel type or a regulator circuit having a function of output control, for example, can be used as the switch 55.

The switch 55 causes the power supply wire to have electrical continuity when the output signal V 53 of the OR circuit 53 is in a low level, but cuts off the power supply wire when the output signal V53 of the OR circuit 53 is in the high level. That is, when the abnormal state of the integrated circuit 11 is detected, the switch 55 temporarily stops supplying the power supply to the integrated circuit 11 thus to shut off a latch-up current flowing through the integrated circuit 11. This restores the integrated circuit 11 from a latch-up condition.

The length of a period of time during which the switch 55 cuts off the power supply wire corresponds to that during which the output signal V53 of the OR circuit 53 is in the high level. The length is specified by the delay time set in the signal delay circuit 54. Having a long period of time during which the switch 55 cuts off the power supply wire has enough time after the latch-up current of the integrated circuit 11 is shut off and before junction temperature of a semiconductor element drops to a fixed temperature, and also prevents the latch-up condition from occurring again when the power supply is turned on.

Figure 4:
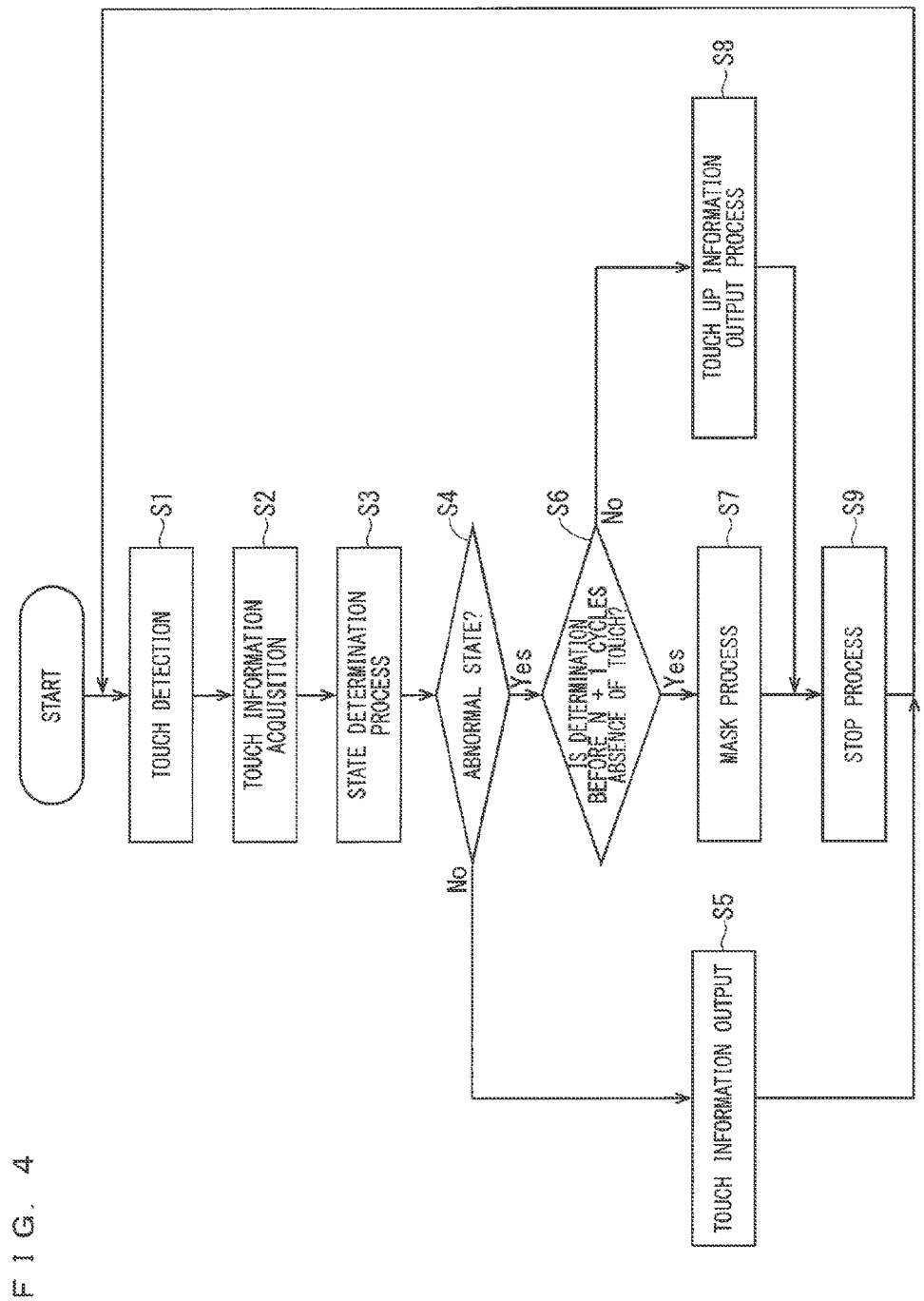
FIG. 4 is a flowchart showing an operation of the touch panel device according to the first preferred embodiment.
Figure 5:
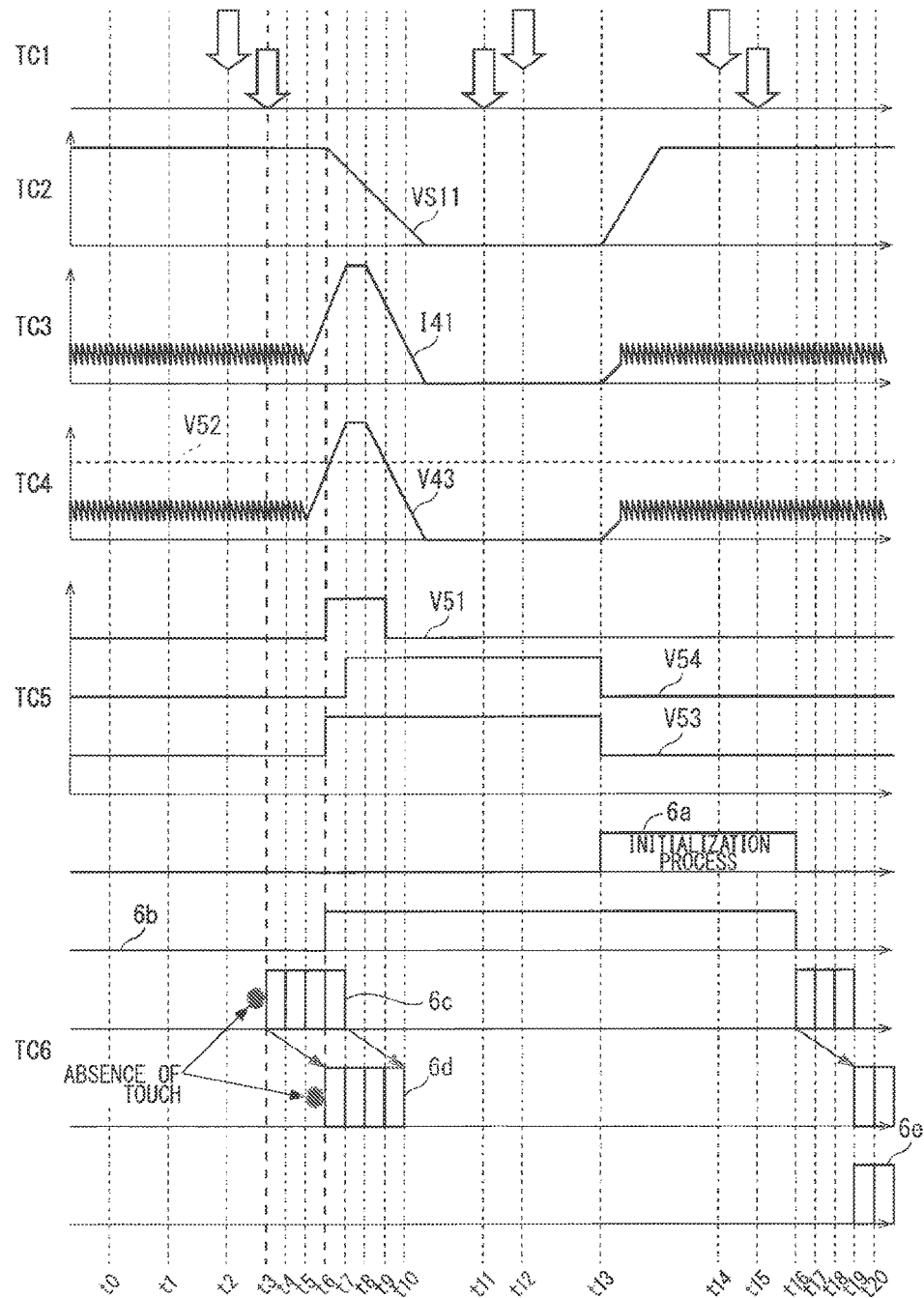
FIGS. 5 and 6 are timing charts showing the operation of the touch panel device according to the first preferred embodiment.
Figure 6:
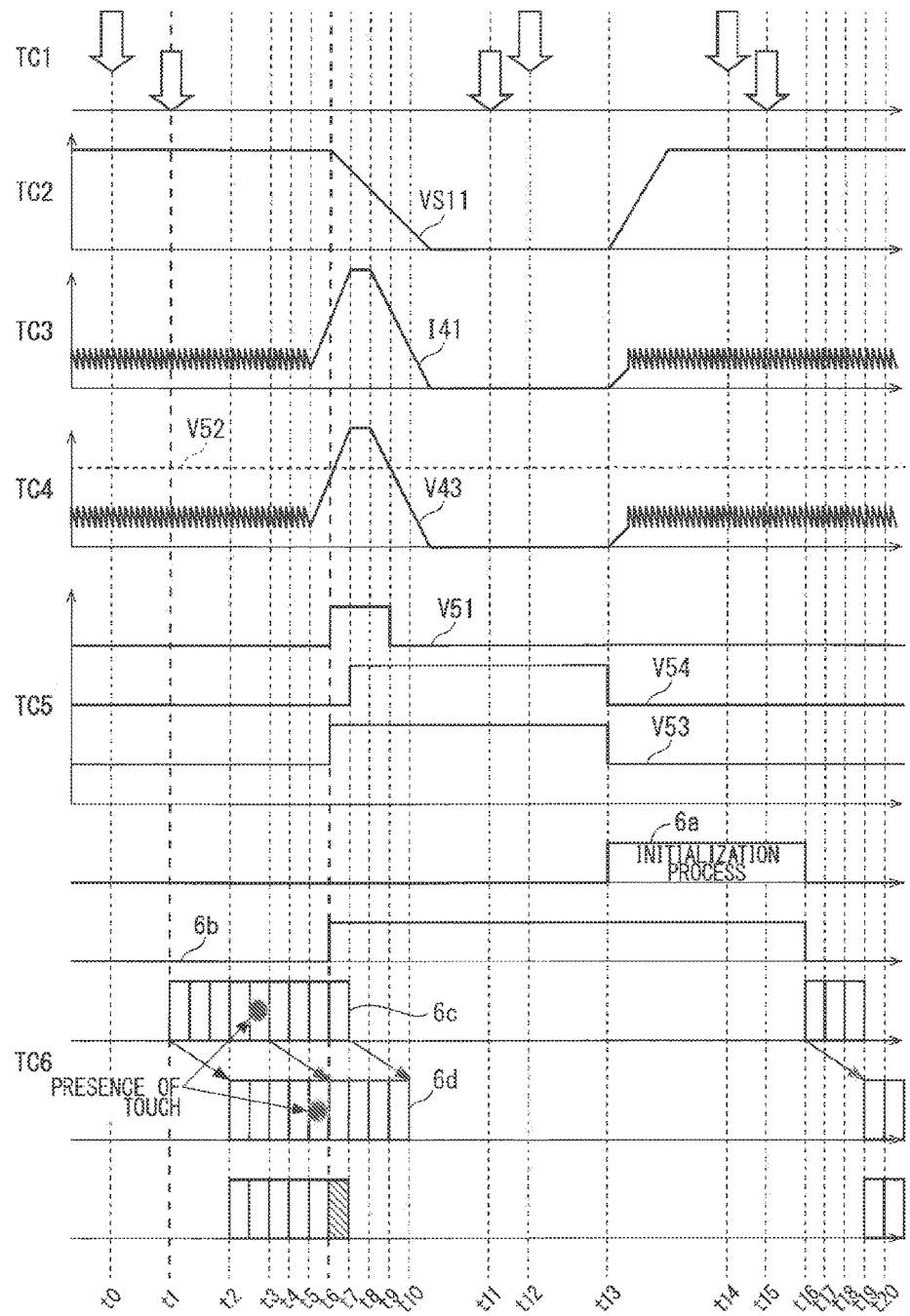

Next, the following describes the operation of the touch panel device according to the first preferred embodiment with reference to FIGS. 4 to 6. FIG. 4 is a flowchart showing the operation of the touch panel device. The flowchart of FIG. 4 is a loop-like flowchart starting from step S1, followed by performing step S5 or step S9 and then returning to step S1. This one loop is defined as one period (cycle) of operation (a touch detection operation) for the touch detection unit 3 of the touch panel device to detect the touch. Hereinafter, N loops are referred to as "N cycles".

Further, in this preferred embodiment, the output control unit 6 sequentially stores touch information of past N cycles detected by the touch detection unit 3, and then outputs the touch information to the host equipment while delaying the touch information by the N cycles. It is preferable that N is equal to or greater than one and is set to as great a value as possible within a range (commonly within 100 milliseconds) that does not provide a feeling of strangeness to a user if a response to a touch operation is delayed by N cycles.

Upon a start of the touch detection operation in the touch panel device, the sensing unit 2, first, measures a capacitance within the touch panel using the outputs (sensor measurement values) of the sensor of the touch sensor panel 1, thus detecting the touch of the indicator to the touch sensor panel 1 (step S1) and outputting the signal according to the touch to the touch detection unit 3. Based on the output of the sensing unit 2, the touch detection unit 3 acquires the touch information indicating the presence or absence and the coordinate of the touch of the indicator in the touch sensor panel 1 (step S2). A publicly known method is used to acquire the touch information. For example, a method disclosed in Japanese Patent Application Laid-Open No. 2010-191778 can be used.

Then, based on the output signal V51 of the comparison circuit 51 in the state restoration unit 5, the output control unit 6 performs a state determination process of determining whether the operation state of the integrated circuit 11 (the sensing unit 2 and the touch detection unit 3) is in the normal state or in the abnormal state (step S3). Note that although the flowchart in FIG. 4 describes the state determination process (step S3) performed by the output control unit 6 as a step subsequent to a touch information acquisition process (step S2) performed by the touch detection unit 3 for convenience of description, the state determination process is always performed regardless of operation timing of the touch detection unit 3. Specifically, the state determination process performed by the output control unit 6 is performed in such a way that, for example, the output signal V51 of the comparison circuit 51 is used as an interrupting signal of the microcomputer that is the output control unit 6 and that the microcomputer detects presence or absence of the interrupting signal during a program process.

The output control unit 6, when determining that the integrated circuit 11 is in the normal state, outputs the touch information acquired by the touch detection unit 3 in step S2 to the host equipment (step S5). The flowchart then returns to step S1 (one cycle of a touch detection process completes). Note that in this preferred embodiment, the output control unit 6 outputs the touch information to the host equipment while delaying the touch information by the N cycles, and thus prior touch information by the N cycles is output in step S5.

When the integrated circuit 11 is determined to be in the abnormal state (Yes in step S4), the following processes in steps S6 to S9 are performed in order to prevent unintended touch information from being output to the host equipment or prevent touch information free from coordinate information (touch up information) necessary to indicate completion of the touch operation (touch up) from being output to the host equipment.

First, the output control unit 6 determines whether the touch has been detected in step S2 of N+1 cycles earlier than a process time (step S6).

In the absence of the touch the N+1 cycles earlier (Yes in step S6), the output control unit 6 performs a process (mask process) of forcedly masking the touch information (step S7) so that the output of the touch information is stopped at timing of the detection of the abnormal state. The integrated circuit 11 outputs the touch information while delaying the touch information by the N cycles, and thus all touch information detected by the touch detection unit 3 from the N cycles earlier to a current cycle is masked in the mask process. This prevents the unintended touch information due to the abnormality of the integrated circuit 11 from being output. A process (stop process) of stopping the output of the touch information for a fixed amount of time is then performed (step S9). The flowchart then returns to step S1 (one cycle of the touch detection process completes).

It is preferable that a length of time to stop the output of the touch information in the stop process (step S9) is equal to or greater than the sum of a time necessary for the state restoration unit 5 to eliminate the latch-up condition of the integrated circuit 11 and an initialization time of the integrated circuit 11, and the length of time is a shortest time (about several tens of milliseconds to several hundred milliseconds) that less affects a user's input operation.

The time necessary to eliminate the latch-up condition of the integrated circuit 11 is at least equal to or greater than the sum of a time after the state restoration unit 5 detects the latch-up condition of the integrated circuit 11 and before the state restoration unit 5 turns off the power supply (a power supply turning off time) and a time after the state restoration unit 5 turns on the power supply and before the integrated 11 starts operating (a power supply re-turning on time). When the sum of the power supply turning off time and the power supply re-turning on time is not enough, a waiting time is provided after the power supply is turned off and before the power supply is turned back on. Moreover, the initialization time of the integrated circuit 11 is a time necessary for processes, such as initialization of hardware, loading of a firmware program, and generation of a baseline value of the sensor measurement value of the touch sensor panel 1.

Meanwhile, in the presence of the touch the N+1 cycles earlier (No in step S6), the state restoration unit 5 determines that the latch-up condition has occurred in the middle of the touch operation (during the output of the touch information). In this case, the state restoration unit 5 performs a process (a touch up information output process) of outputting touch information (prior touch information by N cycles) with additional information (touch up information) indicating the completion of the touch operation (step S8) in order to prevent the host equipment from malfunctioning if the output of the touch information is interrupted. Then, the process (the stop process) of stopping the output of the touch information for the fixed amount of time is performed (step S9). The flowchart then returns to step S1 (one cycle of the touch detection process completes).

Next, the following describes cooperation between the operation of hardware and a software process in the touch panel device. FIGS. 5 and 6 are examples of timing charts showing the operation of the touch panel device. Here, the output control unit 6 outputs the touch information acquired by the touch detection unit 3 while delaying the touch information by three cycles (i.e., N=3). Each timing chart of FIGS. 5 and 6 includes charts TC1 to TC6, time axes (lateral axes) of which are common.

The chart TC1 shows a touch state of the indicator to the touch sensor panel 1. In the chart TC1, a period of time sandwiched by two arrows in contact with the time axis represents a period of time during which the touch sensor panel 1 is being touched, and other sections (periods of time sandwiched by two arrows away from the time axis) represent periods of time during which the touch sensor panel 1 is not being touched.

The chart TC2 shows the power supply voltage (an input power supply voltage VS11) to be input to the integrated circuit 11 including the sensing unit 2 and the touch detection unit 3. The chart TC3 shows the power supply current I41 flowing through the integrated circuit 11.

The chart TC4 shows the output voltage V43 of the state sensing unit 4 and the reference voltage V52 generated by the reference voltage generation circuit 52 of the state restoration unit 5. The chart TC 5 shows the output signal V51 of the comparison circuit 51, the output signal V54 of the signal delay circuit 54 and the output signal V53 of the OR circuit 53 in the state restoration unit 5.

The chart TC6 shows the operation of the output control unit 6 conceptually. The chart TC6 further includes a timing diagram 6a showing the initialization time of the integrated circuit 11, a timing diagram 6b showing a time to perform the mask process of the touch information, a timing diagram 6c showing a detection result of the touch by the touch detection unit 3, a timing diagram 6d showing a result with the detection result of the touch by the touch detection unit 3 delayed by N cycles, where N=3, and a timing diagram 6e showing touch information to be actually output to the host equipment. In the timing diagrams 6c to 6e, the touch information is denoted by rectangles.

Note that the initialization time of the integrated circuit 11 represented as a high level period of time of the timing diagram 6a is the time necessary for the processes, such as the initialization of the hardware, the loading of the firmware program and the generation of the baseline value of the sensor measurement value of the touch sensor panel 1.

Further, a time to forcedly mask a coordinate output represented as a high level period of time in the timing diagram 6b is the sum of the time necessary to eliminate the latch-up condition of the integrated circuit 11 and the initialization time of the integrated circuit 11. The time necessary to eliminate the latch-up condition of the integrated circuit 11 is equal to or greater than the sum of the time after the latch-up condition is detected and before the power supply is turned off, a time to keep the power supply off and the time after the power supply is turned on and before the integrated circuit 11 starts operating.

Figure 8:
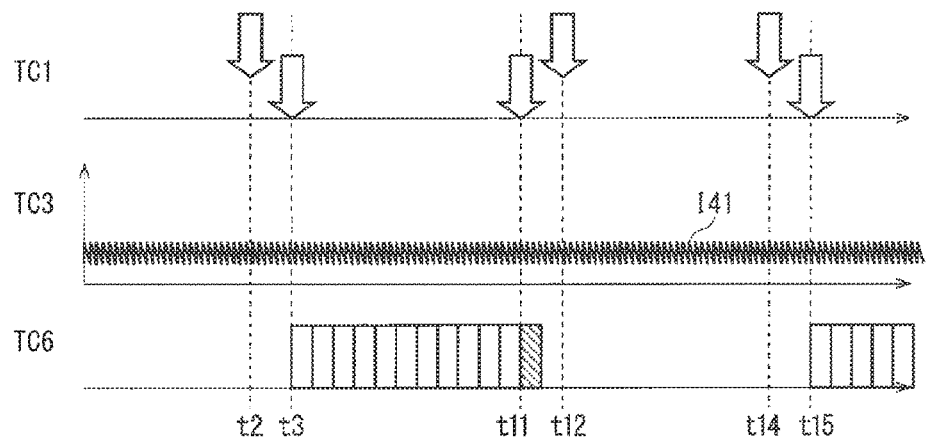
FIG. 8 is a timing chart showing an operation of a conventional touch panel device in a normal state.
Figure 9:
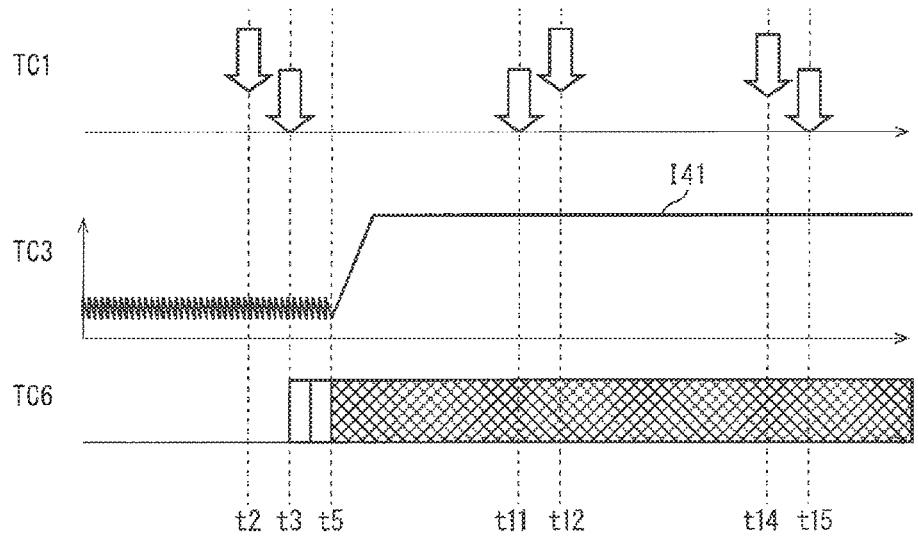
FIG. 9 is a timing chart showing an operation of the conventional touch panel device in an abnormal state.

Now, prior to description of FIGS. 5 and 6, the following describes operation in a normal state and operation in an abnormal state of a conventional touch panel device by using FIGS. 8 and 9 in order to facilitate understanding of FIGS. 5 and 6. In FIGS. 5 and 6, the chart TC1 shows that the touch operation of the touch sensor panel 1 is being performed during a period of time from a time t3 to a time t11 and a period of time after a time t15.

As illustrated in FIG. 8, the power supply current I41 has a current value always in a normal range (the chart TC3) in the normal state of the conventional touch panel device. Moreover, touch information is output to the host equipment during the touch sensor panel 1 is being touched (the chart TC6). Still moreover, touch information (a hatched rectangle) with additional touch up information indicating completion of the touch operation is output immediately after a time t11 when the touch no longer exists.

Further, as illustrated in FIG. 9, an ESD occurs in the touch sensor panel 1 of the conventional touch panel device at a time t5 during the touch operation, and thus the latch-up phenomenon, in which the power supply current I41 excessively flows (the chart TC3), occurs. In this case, although a touch coordinate is output from the time t3 when the touch has occurred until the time t5 when the latch-up phenomenon has occurred, the touch panel device is inoperable after the time t5, and thus the touch information is no longer output (a period of time cross-hatched in the chart TC6). The host equipment may malfunction if the touch panel device falls into such an abnormal state (the latch-up condition). Moreover, if the latch-up phenomenon continues, junction temperature of an integrated circuit may exceed a breakdown temperature (commonly 150° C.), thus resulting in a destruction of the host equipment.

Next, the following describes the operation of the touch panel device according to the preferred embodiment by using FIG. 5. FIG. 5 shows an operation in which a process of S1-S2-S3-S4 (Yes)-S6 (Yes)-S7-S9-S1 . . . is performed in the flowchart of FIG. 4. In FIG. 5, the touch operation is being performed during the period of time from the time t3 to the time t11 and the period of time after the time t15. Moreover, the ESD occurs in the touch sensor panel 1 at the time t5, and the integrated circuit 11 thus falls into in the latch-up condition.

As illustrated in FIG. 5, when the ESD occurs at the time t5, the power supply current I41 flowing through the integrated circuit 11 increases and the output voltage V43 of the state sensing unit 4 rises accordingly. Then, when the output voltage V43 of the state sensing unit 4 exceeds the reference voltage V52 at the time t6, the output signal V51 of the comparison circuit 51 reaches the high level. The output signal V53 of the OR circuit 53 reaches the high level accordingly, and thus the switch 55 is turned off. This drops the input power supply voltage VS11 of the integrated circuit 11. Further, the power supply current I41, which has been causing the latch-up phenomenon, decreases thus to eliminate the latch-up phenomenon.

The decrease in the power supply current I41 decreases the output voltage V43 of the state sensing unit 4. When the output voltage V43 of the state sensing unit 4 falls below the reference voltage V52 at the time t9, the output signal V51 of the comparison circuit 51 reaches the low level. The output signal V53 of the OR circuit 53 is maintained at the high level for a fixed period of time after the output signal V51 of the comparison circuit 51 reaches the low level. Hence, the signal V53 controlling the switch 55 is maintained at the high level until the junction temperature of the semiconductor element drops to the fixed temperature, and the turning off of the power supply continues until the time t13.

Meanwhile, the output control unit 6, when detecting the rise of the output signal V51 of the comparison circuit 51 (Yes in step S4 of FIG. 4), determines the presence or absence of the touch to the touch sensor panel 1 before N+1 cycles (four cycles) in step S6. In FIG. 5, there is no touch just before the time t3 (a black circle position) corresponding to the four cycles (Yes in step S6) earlier, and thus all coordinates occurring from a time of N cycles earlier to a time of the detection of the abnormal state are forcedly masked so that the touch information is not output to the host equipment (step S7). Then, the process (the stop process) of stopping the output of the touch information for the fixed amount of time (a high-level period of time in the timing diagram 6b) is performed (step S9).

Performing these processes prevents unclear coordinate data going back three cycles earlier than the time t6 of the detection of the abnormal state from being output to the host equipment, and also reduces effects on the host equipment. Note that the integrated circuit 11 is restored to be in the normal state after a time t19 after the initialization process of the integrated circuit 11 (a high-level period of time in the timing diagram 6a), and thus the touch information (the touch information of the N cycles earlier) is normally output.

FIG. 6 illustrates an operation in which a process of S1-S2-S3-S4 (Yes)-S6 (No)-S8-S9-S1 . . . is performed in the flowchart of FIG. 4. In FIG. 6, the touch operation is being performed during the period of time from the time t1 to the time t11 and the period of time after the time t15. Moreover, the ESD occurs in the touch sensor panel 1 at the time t5, and the integrated circuit 11 is thus in the latch-up condition.

In FIG. 6 as well, the output control unit 6, when detecting the rise of the output signal V51 of the comparison circuit 51 at the time t6 (Yes in step S4 of FIG. 4), determines the presence or absence of the touch to the touch sensor panel 1 before the N+1 cycles (four cycles) in step S6. In FIG. 6, there is a touch just before the time t3 (a black circle position) corresponding to the four cycles earlier (No in step S6), and thus the touch information with the additional touch up information (the touch information of the N cycles earlier) is output immediately after the time t6 (step S8). Then, the process (the stop process) of stopping the output of the touch information only for the fixed amount of time (the high-level period of time in the timing diagram 6b) is performed (step S9).

In this way, the touch information having the touch up information added to the touch information of pre-occurrence of the abnormality is output to the host equipment. Consequently, the host equipment determines a condition where the abnormal state of the integrated circuit 11 has temporarily stopped the output of the touch information to be a condition where the touch has normally completed and then resumed. This prevents the host equipment from malfunctioning due to the abnormal state.

As described above, the touch panel device according to the preferred embodiment, when detected to be in an abnormal state, is configured such that the state restoration unit 5 restores the integrated circuit 11 (the sensing unit 2 and the touch detection unit 3) to a normal operation, and that the output control unit 6 stops notifying the host equipment of the touch information for the fixed period of time from the time when the output control unit 6 detects the abnormal state. This prevents occurrence of the malfunction of the host equipment and of a destruction of the touch panel device. Moreover, the output control unit 6 outputs the touch information with the additional touch up information and then stops the output of the touch information to the host equipment when the abnormal state occurs during the touch operation. This prevents the malfunction of the host equipment.

Second Preferred Embodiment

Figure 7:
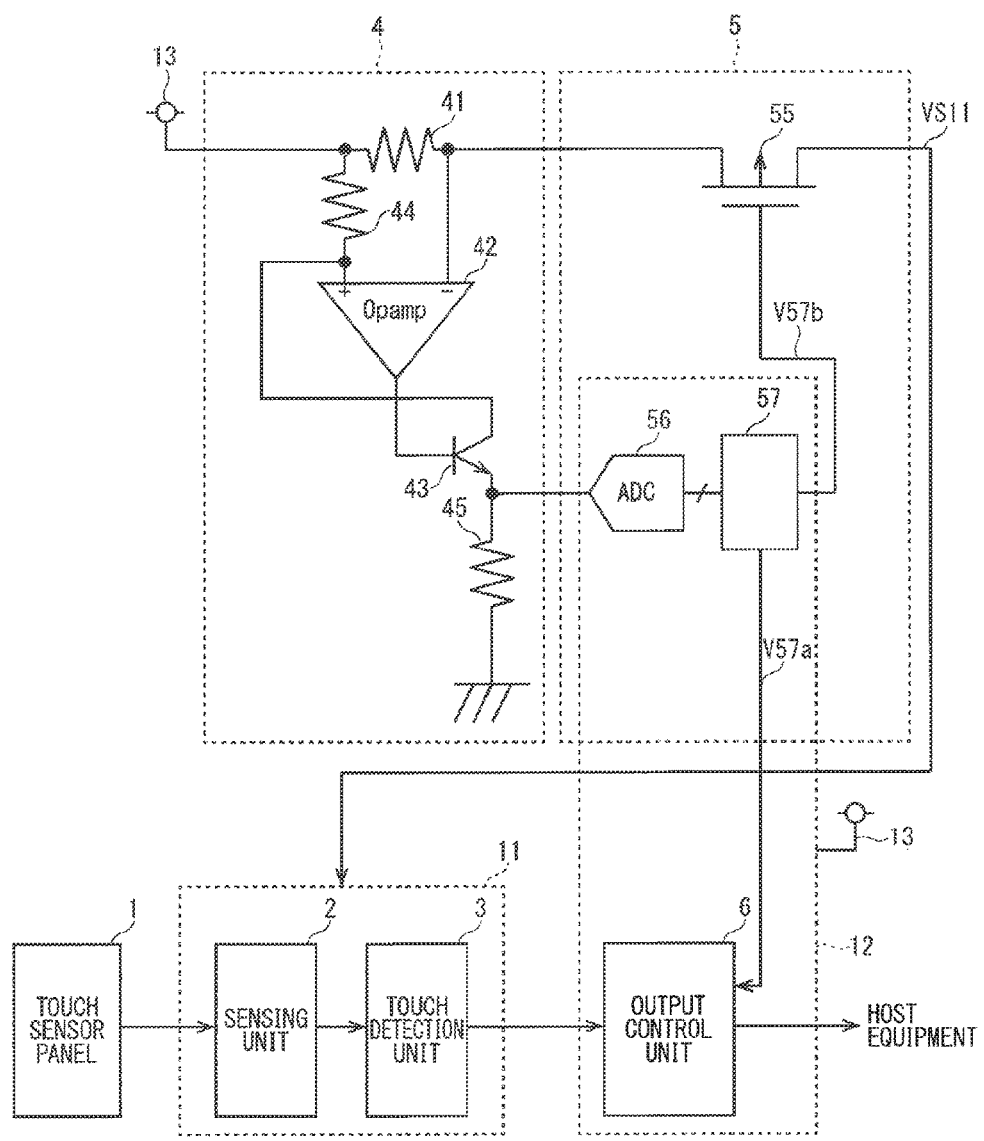
FIG. 7 is a schematic configuration diagram of a state sensing unit and a state restoration unit of a touch panel device according to a second preferred embodiment.

FIG. 7 is a configuration diagram of a touch panel device according to a second preferred embodiment. The touch panel device according to the preferred embodiment has a state restoration unit 5 whose configuration is different from that in FIG. 3. That is, the comparison circuit 51, reference voltage generation circuit 52 and OR circuit 53 as illustrated in FIG. 3 are replaced with an AD conversion circuit 56 (an analog-to-digital conversion (ADC) circuit) and with a calculation circuit 57 operating based on a digital signal output by the AD conversion circuit 56. Note that schematic and hardware configurations of the touch panel device are similar to those in the first preferred embodiment (FIGS. 1 and 2).

The AD conversion circuit 56 converts an output voltage V43 of a state sensing unit 4 to the digital signal. The calculation circuit 57 calculates based on the digital signal output by the AD conversion circuit 56 and then outputs control signals V57a and V57b as a result of the calculation. The control signal V57a is a signal that is at a high level during a period of time when the output voltage V43 of the state sensing unit 4 is a predetermined threshold (determination value) or more. The control signal V57b is a signal that is at a high level when the state sensing unit 4 is the threshold or more and is at a low level after a fixed amount of time from when the output voltage V43 of the state sensing unit 4 falls below the threshold. That is, the control signal V57a is substantially the same as the output signal V51 of the comparison circuit 51 in the state restoration unit 5 of FIG. 3. Moreover, the control signal V57b is substantially the same as the output signal V53 of the comparison circuit 53 in the state restoration unit 5 of FIG. 3.

In this way, the touch panel device according to the second preferred embodiment is configured such that part of the state restoration unit 5 is a digital circuit. Various processes in the state restoration unit 5 are digitalized. Consequently, a time after the output voltage V43 of the state sensing unit 4 exceeds and before the switch 55 is turned off is longer than that in the first preferred embodiment by about several hundred microseconds to several milliseconds (depending on a circuit configuration of the ADC and a calculation capability of an microcomputer). Nevertheless, the AD conversion circuit 56 and the calculation circuit 57 are implemented by the microcomputer, which enables a reduction in cost for components.

Further, although the reference voltage V52 of the comparison circuit 51 is a fixed value in the first preferred embodiment, post-AD-conversion data is processed using the calculation circuit 57 implemented by the microcomputer. This enables complex processes. Such complex processes specifically include processes of storing a determination value in an internal memory of the microcomputer, periodically converting (sampling) the output voltage V43 of the state sensing unit 4 that is an analog value to a digital value, comparing the converted digital value with the determination value and then controlling a coordinate output according to a result of the comparison.

The output voltage V43 of the state sensing unit 4 fluctuates depending on the operation of the integrated circuit 11 even in a normal state of the integrated circuit 11, and thus the converted digital value also has a certain amount of fluctuations. The result of the comparison with the determination value may vary in every conversion to the digital value when a difference between the converted digital value and the determination value is small. In such a case, the operation of an input power supply voltage VS11 may be unstable. Accordingly, to achieve a function similar to the prevention of the chattering by a hysteresis circuit described in the first preferred embodiment, a method is used, such as a weighted average where a current digital value periodically sampled is added to a certain rate of past data thus to take an average, a moving average where multiple past data from the current digital value is averaged, or a median filter where only medians of multiple past data, thus to eliminate noise. This achieves stable determination results.

Further, the integrated circuit 11 may be determined to be in an abnormal state only when consecutively determined to be in the abnormal state a predetermined number of times (m times). In such a case, changing the level of the control signal V57b of the switch 55 when a determination result indicating the abnormal state occurs a plurality of number of times (the m times) can also generate a delay time of a time acquired by multiplying a time necessary for one sampling and determination by m, thus to achieve a further stable operation.

Still further, using a counter within the microcomputer facilitates generating a waiting time necessary to eliminate a latch-up phenomenon and a waiting time necessary to initialize an integrated circuit 12. Moreover, variations in the time necessary to eliminate the latch-up phenomenon, if any, can be also addressed by generating a necessary waiting time after confirming that a power supply current I41 is sufficiently below a threshold.

As described above, the touch panel device according to the preferred embodiment is detected to be in the abnormal state and then restored to the normal operation as well as stopped coordinate notification to the host equipment for the fixed period of time from the time of the detection of the abnormal state, as in the first preferred embodiment. Moreover, the touch panel device, when having received a touch operation just before the detection of the abnormal state, is configured such that touch up information according to the touch operation is added before the coordinate notification is stopped, also as in the first preferred embodiment. This prevents a destruction of a semiconductor integrated circuit mounted in the touch panel device as well as a malfunction of the host equipment with a minimum effect on the host equipment.

The first and second preferred embodiments are described based on the premise that the described touch sensor panel is a PCT touch sensor panel. PCT touch sensor panels, which are composed of a plurality of sensors, are accompanied by, for example, a rise in cost for the components as well as an increase in area of a substrate due to additional components, in an effort to take measures provided to an input terminal against an ESD using a component, such as a semiconductor element (e.g., a varistor or an ESD suppressor) for the measures against the ESD or a current-limiting resistance serially connected to the input terminal. Accordingly, measures of the present invention are effective against the ESD. Moreover, the measures of the present invention may be implemented along with the measures provided to the input terminal against the ESD. In such a case, a further improvement in reliability is expected.

Further, the present invention is widely applicable to a touch panel device in which a sensor electrode of a touch sensor panel is connected to an input terminal of a semiconductor integrated circuit and coordinate data is transmitted to host equipment. The present invention is also applicable to touch panel devices of various methods including, for example, a surface capacitive method in which a touch sensor panel is one surface electrode and terminals connected to four corners in the surface electrode connect to capacitance measurement terminals of a semiconductor integrated circuit, and a resistive film method such as a four-wire resistance film method or a five-wire resistance film method, which in turn such various touch panel devices is less effective to a reduction in cost for the components than the PCT touch panel. Moreover, although each of the above preferred embodiments describes that each sensor of the touch sensor panel 1 has a typical X-Y matrix structure, the present invention is applicable to touch panel devices having different sensor structures of touch sensor panels. Sensors other than the sensor having X-Y matrix structure include, for example, a one-layer sensor, a sensor having an on-cell structure and a sensor having an in-cell structure.

It is to be noted that in the present invention, respective preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch panel device comprising:
   a touch sensor panel;
   a first integrated circuit comprising a sensing unit and a touch detection unit;
   a second integrated circuit comprising an output control unit and a peripheral circuit, said peripheral circuit comprising a state sensing unit and a state restoration unit;
   said sensing unit configured to output a signal according to a touch of an indicator to said touch sensor panel;
   said touch detection unit configured to detect presence or absence and a coordinate of said touch of said indicator to said touch sensor panel, based on an output of said sensing unit;
   said output control unit configured to control an output of touch information to host equipment, said touch information indicating said presence or absence and said coordinate of said touch of said indicator to said touch sensor panel detected by said touch detection unit;
   said state sensing unit configured to sense an operation state of said sensing unit or said touch detection unit; and
   said state restoration unit configured to detect a latch-up condition of said sensing unit or said touch detection unit based on a detection result of said state sensing unit, and to restore said sensing unit or said touch detection unit in said latch-up condition to a normal state, wherein
   upon detection of said latch-up condition, said output control unit stops said output of said touch information to said host equipment for a fixed period of time after said detection of said latch-up condition.

2. The touch panel device according to claim 1, wherein said touch sensor panel includes a plurality of sensors.

3. The touch panel device according to claim 1, wherein said sensing unit is a sensor that measures a capacitance of said touch sensor panel.

4. The touch panel device according to claim 1, wherein said output control unit and said sensing unit or said touch detection unit are driven by power supplies different from each other.

5. The touch panel device according to claim 1, wherein said state restoration unit detects said latch-up condition based on a weighted average value or a moving average value acquired by calculating magnitude of a power supply current of said sensing unit or said touch detection unit a plurality number of times.

6. The touch panel device according to claim 1, wherein said state restoration unit determines whether said sensing unit or said touch detection unit is in said latch-up condition in a fixed period, and determines that said sensing unit or said touch detection unit is in said latch-up condition only when consecutively determining said latch-up condition a predetermined number of times.

7. A touch panel device comprising:
a touch sensor panel;
a first integrated circuit comprising a sensing unit and a touch detection unit;
a second integrated circuit comprising an output control unit and a peripheral circuit, said peripheral circuit comprising a state sensing unit and a state restoration unit;
said sensing unit configured to output a signal according to a touch of an indicator to said touch sensor panel;
said touch detection unit configured to detect presence or absence and a coordinate of said touch of said indicator to said touch sensor panel, based on an output of said sensing unit;
said output control unit configured to control an output of touch information to host equipment, said touch information indicating said presence or absence and said coordinate of said touch of said indicator to said touch sensor panel detected by said touch detection unit;
said state sensing unit configured to sense an operation state of said sensing unit or said touch detection unit; and
said state restoration unit configured to detect an abnormal state of said sensing unit or said touch detection unit based on a detection result of said state sensing unit, and to restore said sensing unit or said touch detection unit in said abnormal state to a normal state, wherein
upon detection of said abnormal state, said output control unit stops said output of said touch information to said host equipment for a fixed period of time after said detection of said abnormal state, and
said output control unit
outputs said touch information to said host equipment while delaying said touch information by N cycles of a period during which said touch detection unit determines said presence or absence of said touch of said indicator to said touch sensor panel, where N≥1, and
stops said output of said touch information at timing of said detection of said abnormal state so that said touch information after said N cycles earlier than said timing of said detection of said abnormal state is not output to said host equipment.

8. The touch panel device according to claim 7, wherein said output control unit outputs touch information of N cycles earlier having additional information indicating completion of a touch operation, and thereafter stops said output of said touch information in case of a determination of presence of said touch of said indicator to said touch sensor panel at a timing N+1 cycles earlier than said timing of said detection of said abnormal state.

9. A touch panel device comprising:
a touch sensor panel;
a first integrated circuit comprising a sensing unit and a touch detection unit;
a second integrated circuit comprising an output control unit and a peripheral circuit, said peripheral circuit comprising a state sensing unit and a state restoration unit;
said sensing unit configured to output a signal according to a touch of an indicator to said touch sensor panel;
said touch detection unit configured to detect presence or absence and a coordinate of said touch of said indicator to said touch sensor panel, based on an output of said sensing unit;
said output control unit configured to control an output of touch information to host equipment, said touch information indicating said presence or absence and said coordinate of said touch of said indicator to said touch sensor panel detected by said touch detection unit;
said state sensing unit configured to sense an operation state of said sensing unit or said touch detection unit; and
said state restoration unit configured to detect an abnormal state of said sensing unit or said touch detection unit based on a detection result of said state sensing unit, and to restore said sensing unit or said touch detection unit in said abnormal state to a normal state, wherein
upon detection of said abnormal state, said output control unit stops said output of said touch information to said host equipment for a fixed period of time after said detection of said abnormal state, and
a length of a period of time to stop said output of said touch information to said host equipment after said detection of said abnormal state is set to be equal to or longer than the sum of a time necessary for said state restoration unit to eliminate said abnormal state of said sensing unit or said touch detection unit and a time necessary for an initialization process of said sensing unit or said touch detection unit.

* * * * *